Patented May 24, 1927.

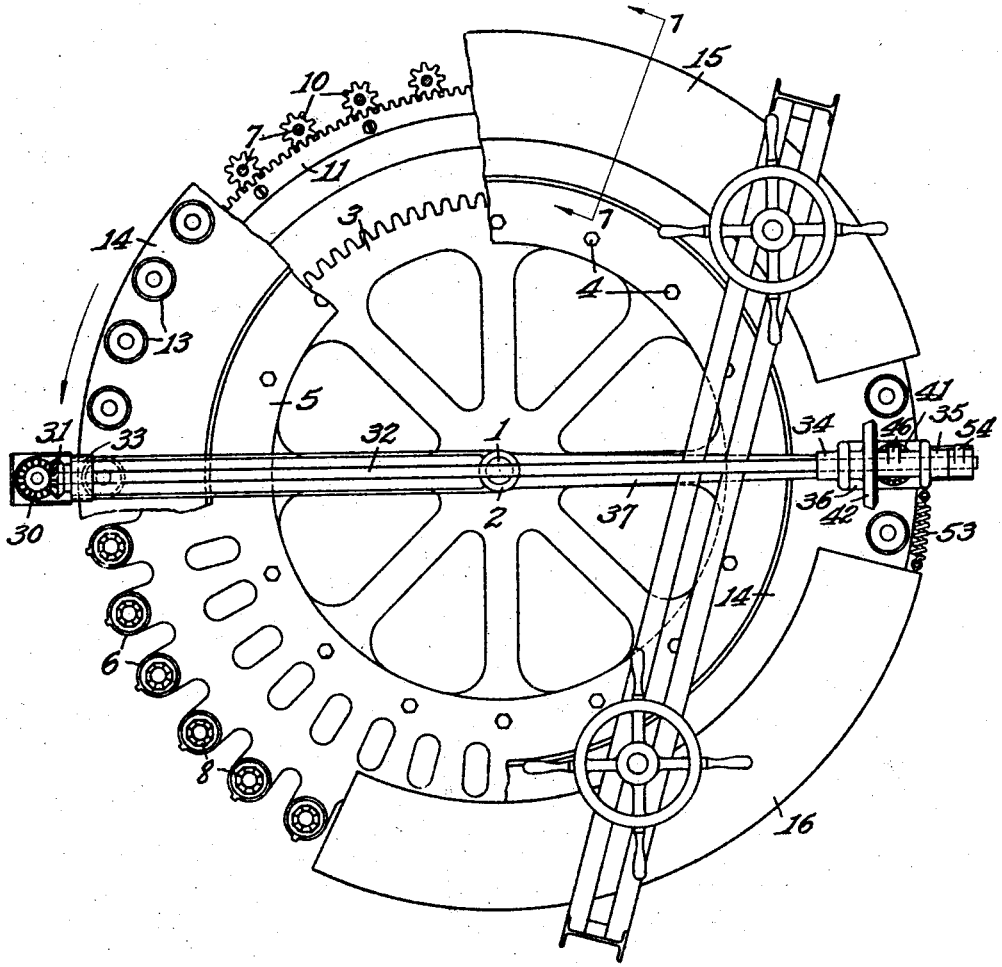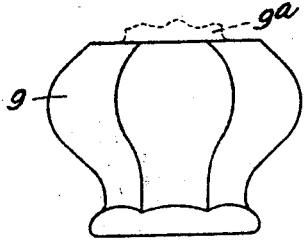

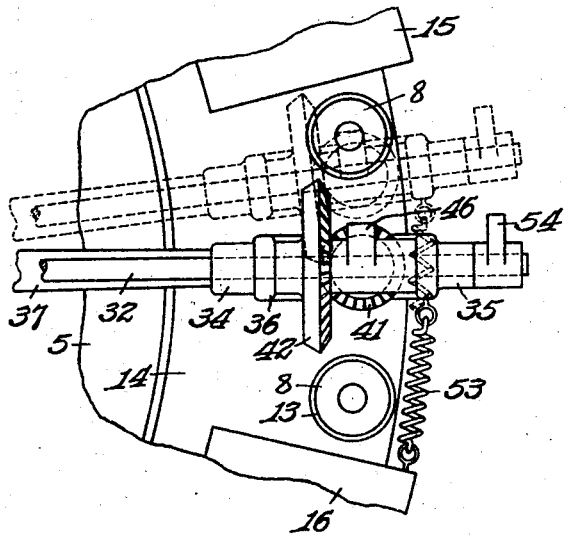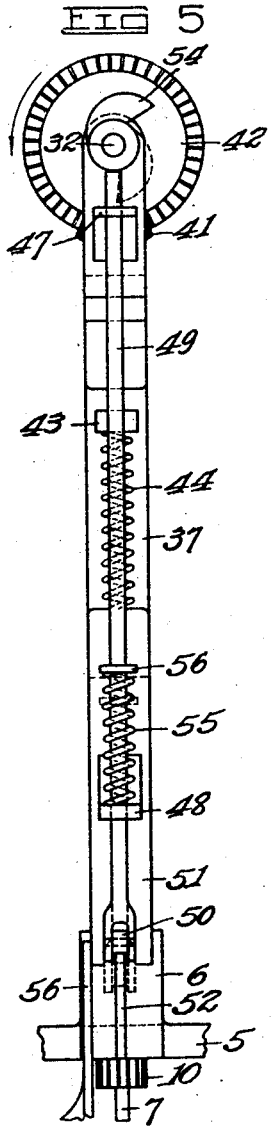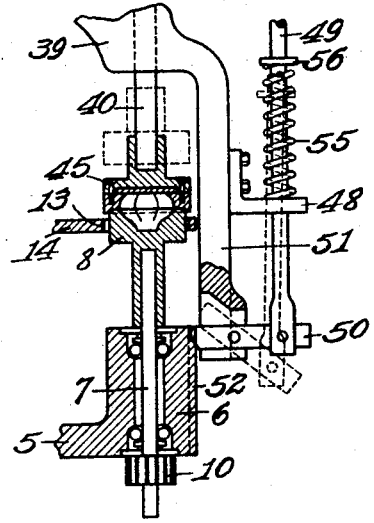

1,629,827

UNITED STATES PATENT OFFICE.

RAYMOND T. KIMBLE, OF CAMBRIDGE, OHIO, ASSIGNOR TO THE CAMBRIDGE GLASS COMPANY, OF CAMBRIDGE, OHIO, A CORPORATION OF OHIO.

MACHINE FOR FINISHING PRESSED-GLASS ARTICLES.

Application filed October 30, 1925. Serial No. 65,770.

This invention relates broadly to mechanism for fire finishing and polishing glass articles, and more specifically to a machine of this character designed for the finishing of glass knobs for doors.

The primary object of the invention is to provide, in a machine for fire-finishing and polishing pressed glass door knobs, automatic mechanism whereby such door knobs are re-pressed in or during the fire finishing and polishing treatment to which they are subjected, thereby to obviate the necessity for the re-heating and re-pressing operations heretofore uniformly resorted to as steps preceding that in which they are acted upon for effecting fire-finishing and polishing.

It may here be explained that each glass door knob formed in a press mold, as ordinarily, when delivered from such mold carries upon its outer end, or face, a stem-like portion composed of surplus glass contained in the charge of molten glass which was introduced in the mold. When this projection is detached, or knocked off, in the usual manner, there remains on said outer face a short centrally disposed irregular surface projection. As hereinbefore indicated, the molded knob requires re-heating to render plastic the glass composing said projection, following which said knob must be re-pressed to distribute uniformly the glass of said projection over the said face of the knob, giving to the latter a finished symmetrical form. Such re-heating and re-pressing have heretofore been performed as steps preliminary to the usual finishing and polishing operations.

It is the chief aim of the present invention to effect mechanically the required re-heating and re-pressing, above referred to, in the same machine and in the same operation by which is effected the final fire-finishing and polishing of the knobs.

In describing the invention in detail, reference is herein had to the accompanying drawings, in which—

Figure 2 is a top plan view of the same, showing parts broken away;

Figure 3 is a side elevation of a glass door knob having an incomplete shape typical of that to which my invention is applicable for imparting a finished form;

Figure 4 is an enlarged detail view of a fragmentary portion of the machine showing in top plan the re-pressing mechanism employed;

Figure 5 is an outer end elevation of said re-pressing mechanism;

Figure 6 is a sectional elevation of the mold portion of said mechanism; and—

Figure 1:
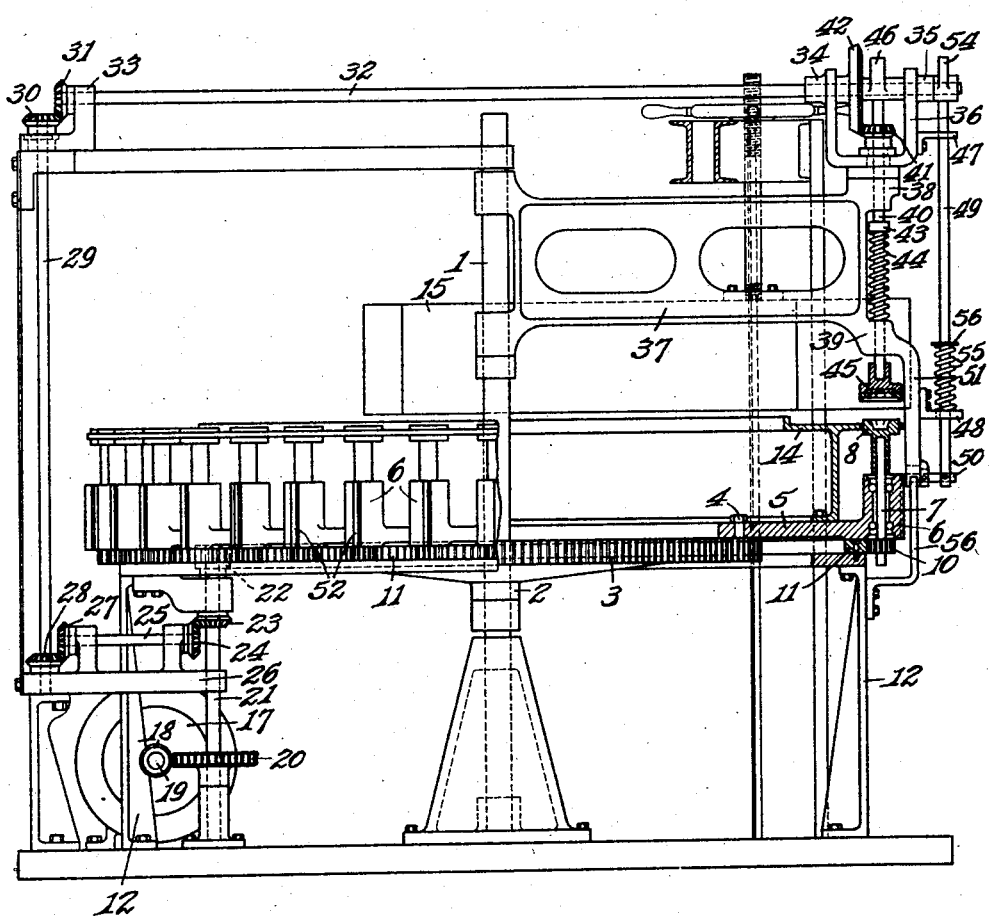
Figure 1 is a view, partly in side elevation and partly in vertical section, of a fire-finishing and polishing machine of a commercial type, illustrating in connection therewith the structure which constitutes my invention.
Figure 7:
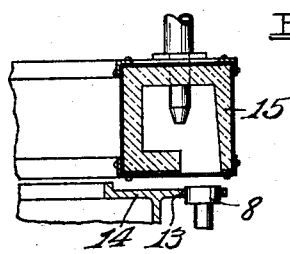
Figure 7 is a cross section on line 7—7, Fig. 2.

Referring to said drawings, 1 indicates an upright post or standard upon which is rotatably mounted the hub 2 of a crown gear 3. Fixed upon said gear, as by means of bolts 4, is the inner edge portion of a flat circular ledge 5 which projects outward beyond the periphery of said gear, as shown, and which carries upon its outer edge portion a plurality of regularly spaced upright sleeve bearings 6 in each of which is rotatably mounted a vertically disposed stem or spindle 7. Each of said spindles has fixed upon its upper end a knob support or carrier 8 which is provided with a socket having a size and form which adapts it for receiving therein the inner end portion of a previously molded door knob 9. Fixed upon the lower end of each spindle 7 is a pinion 10 which, in the rotation of the table constituted by the crown gear 3 and the ledge 5, is continuously in mesh with a ring gear 11 that is stationarily mounted upon suitable supports, as upon upright supporting members or legs 12, whereby continuous rotation is imparted to the various spindles 7 and the thereby-carried knob supports 8.

Said knob supports 8 project upward through and are rotatable in apertures 13 provided therefor in a circular ring-like plate 14 which constitutes a movable bottom member for one or more partial enclosures or furnace-like heating chambers 15 and 16 which are mounted stationarily in overhanging relation to said plate 14. Said furnaces constitute gas-heated chambers and are designed to have the knobs carried therethrough or thereunder in a position wherein they are subjected to the direct action of heat and flame for receiving a fire-finish and polish, as ordinarily. The apertured plate 14 is mounted upon and carried by the ledge 5 of the table, as shown.

The structure hereinbefore described is in all material respects substantially the same structure which constitutes a more or less well-known commercial form of fire-finishing and polishing machine. The motive power therefor, as herein shown, is derived from an electric motor 17, and is transmitted, first, through a worm 18, carried by the rotor 19 of the motor, and a therewith-engaged worm-gear 20 to a suitably journaled upright shaft 21 upon which said worm-gear is carried. A pinion 22 carried by the upper end of said shaft 21 is disposed in driving relation to the crown-gear 3.

The shaft 21 carries a bevel gear 23 in driving relation to a similar gear 24 carried by an end of a horizontal shaft 25 journaled upon a suitable part 26 of a stationary frame structure which is associated with the above described mechanism. The opposite end of said shaft 25 carries a bevel gear 27 which is disposed in driving relation to a similar gear 28 carried by an upright shaft 29 journaled on said frame. Said shaft 29 carries upon its upper end a bevel gear 30 which occupies driving relation to a similar gear 31 carried by an end of a horizontal shaft 32. The last mentioned shaft has its said end journaled more or less loosely in a bearing 33 carried by said frame and thence extends horizontally over the top of the rotary portion of the machine above the upper end of the standard 1 and has its opposite end portion journaled in bearings 34 and 35 carried by the upper ends of the parallel upright members of a yoke 36 which rests upon the top of the outer end of an arm 37.

The arm 37 is supported by the post or standard 1, having its inner end mounted for rotary horizontally swinging movement on said standard. Carried by or formed upon the outer end of said arm are vertically alined bearings 38 and 39 in which is journaled a vertical shaft 40. The yoke 36 is seated upon the top of the bearing 38 and has the upper end portion of the shaft 40 directed upward therethrough and occupying a position between the upright parallel members thereof; and splined on the upper end portion of said shaft 40 is a bevel gear 41 disposed in mesh with a drive gear 42 which is carried by the shaft 32 between said yoke members. Said shaft 40 has fixed thereon intermediate the bearings 38 and 39 a collar 43, and interposed between said collar and the lower bearing 39 is a shaft-encircling compression spring 44 by means of which said shaft, which is depressible longitudinally, is normally maintained in an upwardly thrust position.

Fixed upon the lower end of the vertically movable rotary shaft 40 is a die 45 shaped internally to correspond with the form which it is desired shall be imparted thereby to the outer end portion, or face, of the finished knob 9. Said die is designed to be lowered by depression of said shaft 40 into seated complemental relation to the rotary knob supports 8 as the latter assume vertically alined relation thereto, as will hereinafter be explained.

Carried in fixed relation to the shaft 32 at a point intermediate the yoke-carried bearings 34 and 35 is a cam 46 which rides upon the upper end of the shaft 40 and which, in each rotation of the shaft 32, acts to depress the shaft 40 against the tension of the spring 44 to the position in which the die 45 seats upon the therewith-alined knob support 8, as shown in Fig. 6. Said die and said knob support are geared to rotate at precisely the same speed and are so disposed relatively that the former, when depressed as aforesaid, accurately regitsers with the latter for conformably engaging the facets presented by the thereby-carried knob.

Since the rotary movement of the table or ledge 5, by which is borne the knob supports, is continuous, it is manifestly necessary that the die 45, which is successively reciprocated into cooperative relation with the successive knob supports and which must occupy such relation for a brief interval in order to perform its pressing function, must, in said interval, follow the rotary movement of said table. The mounting of the carrying arm 37 for swinging movement on the standard 1, as also the loose mounting of the shaft 32 in its bearing 33, provides for the required short travel of the die, which travel is indicated by the distance between the full line and dotted line positions of the die-overlying mechanism shown in Fig. 4.

Disposed for longitudinal shifting movement through guide-eyes provided in suitably disposed brackets 47 and 48 is a vertical rod 49 which is pivotally attached at its lower end to the outer end of a small trigger-like lever 50. Said lever is pivotally mounted intermediate its ends on the lower bifurcated end of a vertical arm 51 which is carried by and depends from the lower outer end portion of the swinging arm 37 in a position just out of range of the path of rotary movement of the upright sleeve bearings 6 carried by the ledge 5. The lever 50 normally occupies a horizontal position in which its inner end is adapted to be engaged by a projection 52, herein shown as of vertical rib form, borne on the outer side of the walls of each of said sleeve bearings 6. With the swinging arm 37 disposed in its normal full-line position shown in Fig. 4, held in said position by a retractile coil spring 53 interposed between said arm and a suitably located fixed part of the structure, as the adjacent end of the member 15 of the furnace, the inner end of the lever 50 is successively engaged by the projections 52 of the various sleeve bearings 6 as the latter advance in the rotation of the table.
So engaged, said lever is advanced with said bearings and table throughout a definite short distance, thus effecting the advance therewith of the arm 37 and the thereby supported die-carrying shaft 40. In the brief interval involved in such advance movement, the die 45 seats upon the knob support 8 and effects, by the applied pressure, the distribution of the glass contained in the irregular protuberant portion 9ª of the knob, the outer end of said knob, including said portion, being then in a plastic workable condition.

At approximately the position indicated in dotted lines in Fig. 4, the cam 46 will have rotated to a position in which the shaft 40 and the thereby-carried die 45 actuated by the spring 44, has been elevated out of the path of movement of the knob. Also, at said point, the lever 50 becomes wholly withdrawn from engaged relation to the projection 52 of the sleeve-bearing 6 by which advance movement of the arm 37 is effected, and, actuated by the retractile spring 53, said arm and the parts carried thereby are instantly swung back to their initial, or normal, position shown in full lines in Fig. 4.

The aforesaid withdrawal of the lever 50 to a position in which the advancing arm 37 is released, as described, is effected by means of a cam 54 which acts upon the upper end of the rod 49 for depressing the latter against the tension of a compression spring 55 which embraces said rod, said spring having its lower end seated upon the lower guide bracket 48 and having its upper end resting against a collar 56 carried by said rod. In each rotation of the cam 54, the rod 49 is thereby gradually depressed against the tension of said spring 55 to the point at which the lever 50 is swung on its pivotal mounting to the withdrawn position thereof indicated in dotted lines in Fig. 6. Immediately following said withdrawal and the instant return of the arm 37 to its normal position the cam 54 rides off the rod 49, allowing the latter to be instantly returned to its normal elevated position wherein the lever 50 is positioned to be engaged by the projection 52 of the next succeeding sleeve bearing 6.

Briefly described, the operation of the invention is substantially as follows:

Finished knobs 9 are removed from, and unfinished knobs are introduced in, the advancing constantly-rotating supports 8 of the rotating table at a point rearward with respect to the entrance end of the furnace 16. As the unfinished knobs are carried beneath said furnace, their projecting upper end portions are exposed to the high temperature maintained in said furnace. As each knob passes from beneath said furnace, the die 45 seats upon the said upper end portion thereof, which portion has been rendered more or less plastic by the heat of the furnace, and said die, by the pressure applied therethrough, effects redistribution of the plastic glass of said portion, including the irregular protuberance 9ª, to the extent that said portion is caused to take the finished form provided for by the shape of the socket of said die. This re-shaping is effected in the brief interval required for travel of the parts from the full line position to the dotted line position shown in Fig. 4.

The accurate seating of the die 45 upon the successive knobs is assured by the interengagement of the projections 52 of the sleeve-bearings 6 with the lever 50 as the knob supports successively assume vertically alined relation to said die. Further the movements of the various parts of the mechanism are so timed relatively that, in the short forward travel of the die-carrying arm 37, the die is lowered into seated embracing pressing relation to the knob and is then elevated to knob-clearance position. Instantly following release of the swinging arm 37, effected by withdrawal of the lever 50 from engaged relation to the projection 52, said arm is actuated by the spring 53 to return to its normal position against a properly located stop-arm 58. At the same instant, the upper end of the rod 49 rides off the high point of the cam 54, whereupon the spring 55 instantly effects elevation of said rod, whereby the lever 50 is returned to its lowered position in readiness to be engaged by the next succeeding advancing sleeve-bearing 6.

Following the re-pressing operation described, the knobs are carried through or under the furnace 15 for receiving the required fire-finish and polish. Emerging from said furnace, said knobs become sufficiently cool to permit of handling by the time they reach the removal point or station.

It will of course be understood that the gearings herein shown and described are intended merely for illustrative purposes and that various other arrangements of such gearings may be employed when and if desired. It will be understood, further, that the various parts of the mechanism are so timed relatively that they function in proper time and sequence.

From the foregoing, it will be manifest that the operations of re-heating re-pressing and fire-polishing and finishing are performed automatically in proper succession, thereby eliminating the several successive handlings heretofore required and reducing to a minimum the time required to perform such operations.

What is claimed is—

1. In a fire-finishing and polishing machine for articles of glassware, a rotary table, means for continuously rotating said table, ware supports borne by said table, a furnace for re-heating the ware during the advance travel of the latter, a re-pressing die, and automatic means for reciprocating said die into cooperative relation to the successively advancing supports for re-pressing the reheated articles, and means for fire-finishing the re-pressed ware in the further travel of the table.

2. In a fire-finishing and polishing machine for articles of glassware, a continuously rotating table, ware supports borne by said table, means continuously rotating said supports, a furnace for re-heating the ware during the advance travel of the latter, a re-pressing die, automatic means for reciprocating said die into cooperative relation to the successively advancing supports for re-pressing the reheated articles, and means for fire-finishing and polishing the re-pressed articles during a further travel thereof.

3. In a fire-finishing and polishing machine for articles of glassware, a constantly rotated table, ware supports borne by said table, means associated with said table whereby re-heating of the ware is effected during the advance travel of the latter, a re-pressing die, automatic means for reciprocating said die into cooperative ware-re-pressing relation to successive supports, means whereby said die is actuated to travel in vertically alined relation with successive supports during the repressing operation, and means for returning said die to its normal station following each such operation, and means for fire-finishing the re-pressed ware during a further travel of the table.

4. In a fire-finishing and polishing machine for articles of glassware, a constantly rotating table, ware supports borne by said table, a ring-like plate borne by said table and through which said supports project, stationary means overhanging said plate whereby the ware is reheated in the advance travel of said supports, a pivoted arm, a re-pressing die carried by said arm, means whereby successive supports act to advance said arm therewith throughout a definite interval, means for reciprocating said die into ware re-pressing relation to the successive supports in such interval, means for returning said arm to its normal position following each re-pressing operation, and fire-finishing and polishing means arranged to act upon the ware following such re-pressing operation.

5. In a fire-finishing and polishing machine for articles of glassware, a constantly rotating table, ware supports borne by said table, means for effecting re-heating of the ware in the advance travel of said supports, a pivoted arm, a re-pressing die carried by said arm, means whereby successive supports act to advance said arm therewith throughout a definite interval, a rotating cam whereby said die is actuated into ware-repressing relation to each support in said interval, means for retracting said die following each actuation thereof, means for returning said arm to normal position at the end of each such interval, and means for fire-finishing and polishing the re-pressed ware in the further rotation of the table.

In testimony whereof, I affix my signature.

RAYMOND T. KIMBLE.